United States Patent
Qi et al.

(10) Patent No.: US 10,536,362 B2
(45) Date of Patent: Jan. 14, 2020

(54) CONFIGURING TRAFFIC FLOW MONITORING IN VIRTUALIZED COMPUTING ENVIRONMENTS

(71) Applicant: Nicira, Inc., Palo Alto, CA (US)

(72) Inventors: Xin Qi, Palo Alto, CA (US); Jingfeng Zhang, Beijing (CN); Da Wan, Beijing (CN); Wenyu Zhang, Beijing (CN); Danting Liu, Beijing (CN); Benli Ye, Beijing (CN); Qiong Wang, Beijing (CN); Hua Wang, Beijing (CN); Raju Koganty, Palo Alto, CA (US); Donghai Han, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 210 days.

(21) Appl. No.: 15/680,220

(22) Filed: Aug. 18, 2017

(65) Prior Publication Data
US 2019/0058649 A1 Feb. 21, 2019

(51) Int. Cl.
*H04L 12/24* (2006.01)
*H04L 12/26* (2006.01)

(52) U.S. Cl.
CPC .......... *H04L 43/14* (2013.01); *H04L 41/0893* (2013.01); *H04L 43/026* (2013.01); *H04L 43/045* (2013.01); *H04L 43/065* (2013.01); *H04L 41/0803* (2013.01); *H04L 43/0876* (2013.01)

(58) Field of Classification Search
None
See application file for complete search history.

(56) References Cited

U.S. PATENT DOCUMENTS

| | | | | |
|---|---|---|---|---|
| 8,165,136 B1* | 4/2012 | Sharma | ............... | H04L 12/4641 370/235 |
| 2003/0217183 A1* | 11/2003 | Rimmer | ................ | H04L 45/742 709/249 |
| 2016/0087859 A1* | 3/2016 | Kuan | .................. | H04L 43/0817 715/736 |
| 2016/0087861 A1* | 3/2016 | Kuan | ................... | H04L 43/065 709/224 |
| 2016/0105333 A1* | 4/2016 | Lenglet | ................ | H04L 43/024 370/252 |
| 2018/0121250 A1* | 5/2018 | Qi | ......................... | H04L 43/026 |

OTHER PUBLICATIONS

Rick Hofstede et al., "Flow Monitoring Explained: From Packet Capture to Data Analysis With NetFlow and IPFIX", IEEE Communication Surveys & Tutorials, Fourth Quarter 2014, pp. 2037-2064, vol. 16, No. 4.

* cited by examiner

*Primary Examiner* — Natisha D Cox
(74) *Attorney, Agent, or Firm* — Su IP Consulting

(57) ABSTRACT

Example methods are provided for configuring traffic flow monitoring in a virtualized computing environment. The method may comprise identifying a first logical entity and a second logical entity for which traffic flow monitoring is required and determining a span associated with the first logical entity and the second logical entity. The span may include a first host supporting the first logical entity and a second host supporting the second logical entity. The method may also comprise, based on the span, configuring the first host to monitor a first traffic flow travelling through the first logical entity at the first host, and the second host to monitor a second traffic flow travelling through the second logical entity at the second host.

21 Claims, 8 Drawing Sheets

400

New IPFIX Profile

General | Applied To ~410

420 — Select one or more logical entities:

Type [ Logical Switch ▼ ]
     Logical Port
     Global

☐ Available                    ☐ Selected

☑ Logical Switch LS1           ☐ Logical Switch LS1
☐ Logical Switch LS2           ☐ Logical Port LP4
☐ Logical Switch LS3

( Save )  ( Cancel )

New IPFIX Profile

440 — General | Applied To

450 — Name:                    [ IPFIXConfig1 ]
460 — Description:              [            ]
470 — Active Timeout (seconds): [ 300 ]
480 — Idle Timeout (seconds):   [ 300 ]
490 — Max Flows:                [ 300 ]
495 — Sampling Probability (%): [ 0.1 ]

( Save )  ( Cancel )

Fig. 4B

Span Information 510

| Logical Entity | Span(Logical Entity) | |
| --- | --- | --- |
| LP1 | Host-A | ~515 |
| LP2 | Host-C | ~520 |
| LP3 | Host-A | ~525 |
| LP4 | Host-B | ~530 |
| LP5 | Host-C | ~535 |
| LP6 | Host-B | ~540 |
| LS1 = (LP1, LP2) | (Host-A, Host-C) | ~545 |
| LS2 = (LP3, LP4) | (Host-A, Host-B) | ~550 |
| LS3 = (LP5, LP6) | (Host-B, Host-C) | ~555 |
| Global | (Host-A, Host-B, Host-C) | ~560 |

700/650

Report information (inner or decapsulated packet) 710
{
- Source address
- Destination address
- Packet size
- Number of packet
- Flow start time
- Flow end time
- Source port number
- Destination port number
- Ingress interface
- Egress interface
- Protocol
- Flow end reason
- TCP flags
- Direction
- IP ToS
- Maximum TTL
- Ingress interface attribute
- Egress interface attribute
- Role of exporter Report information (encapsulated packet) 720
- Logical overlay network ID
- Tenant source address
- Tennant destination address
- Tenant source port number
- Tenant destination port number
- Tenant protocol

CONFIGURING TRAFFIC FLOW MONITORING IN VIRTUALIZED COMPUTING ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a Software-Defined Data Center (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. Further, through software-defined networking (SDN), benefits similar to server virtualization may be derived for networking services. For example, logical overlay networks may be provided that are decoupled from the underlying physical network infrastructure, and therefore may be provisioned, changed, stored, deleted and restored programmatically without having to reconfigure the underlying physical hardware. In practice, traffic flow monitoring may be required in the virtualized computing environment for various reasons. However, to configure traffic flow monitoring, some conventional approaches may necessitate users to have knowledge of the underlying physical implementation of the virtualized computing environment.

BRIEF DESCRIPTION OF DRAWINGS

FIG. 4A is a schematic diagram of an example interface for specifying logical entities for which traffic flow monitoring is required;

FIG. 4B is a schematic diagram of example interface for specifying configuration parameters associated with traffic flow monitoring;

FIG. 7 is a schematic diagram illustrating example report information associated with an example traffic flow in a virtualized computing environment

DETAILED DESCRIPTION

Figure 1:
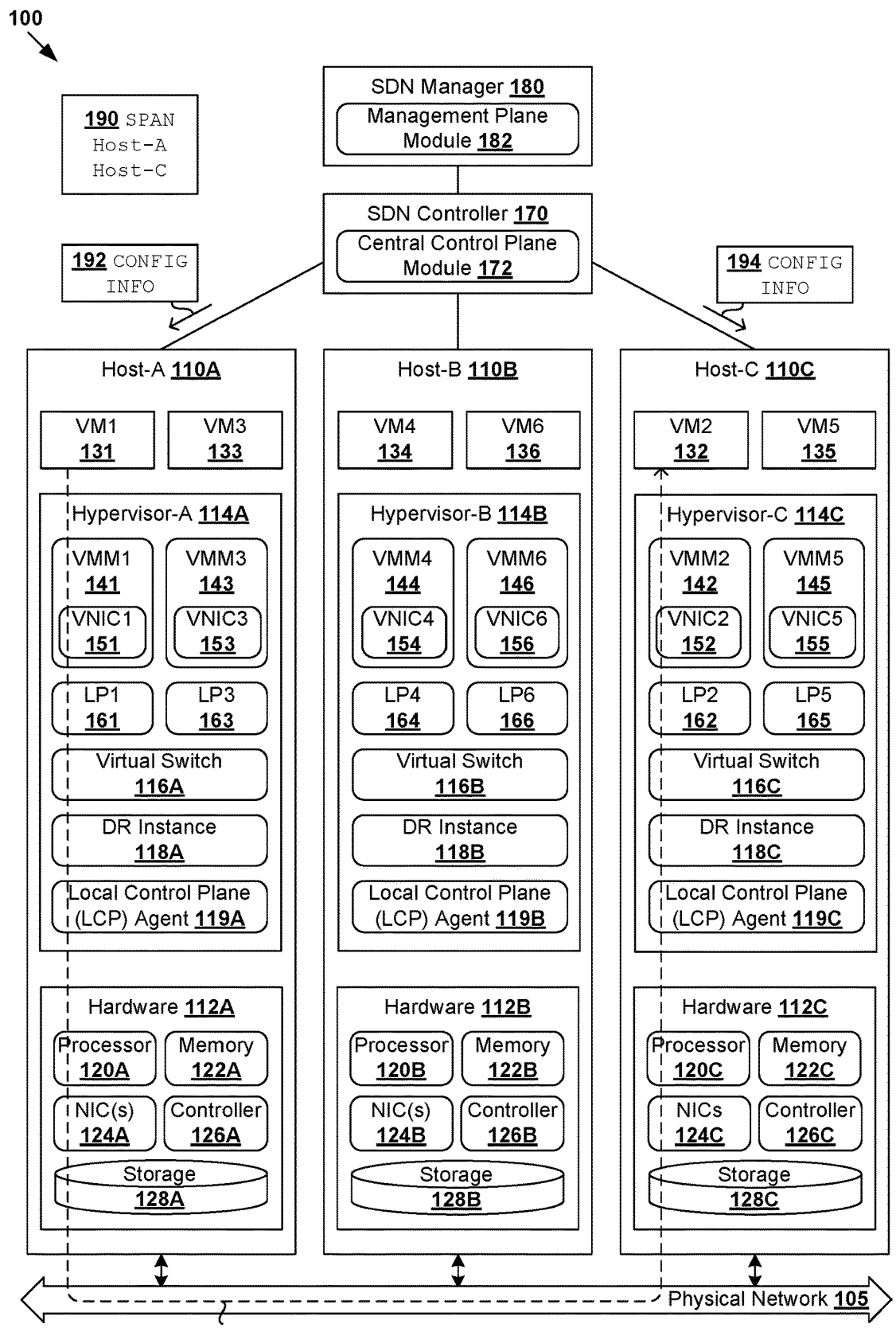
FIG. 1 is a schematic diagram illustrating an example virtualized computing environment in which a traffic flow monitoring may be configured.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to traffic flow monitoring will now be explained in more detail using FIG. 1, which is a schematic diagram illustrating example virtualized computing environment 100 in which traffic flow monitoring may be configured. It should be understood that, depending on the desired implementation, virtualized computing environment 100 may include additional and/or alternative components than that shown in FIG. 1.

In the example in FIG. 1, virtualized computing environment 100 includes multiple hosts, such as host-A 110A, host-B 110B and host-C 110C that are interconnected via physical network 105. Each host 110A/110B/110C includes suitable hardware 112A/112B/112C and virtualization software (e.g., hypervisor-A 114A, hypervisor-B 114B, hypervisor-C 114C) to support various virtual machines. For example, host-A 110A supports VM1 131 and VM3 133; host-B 110B supports VM4 134 and VM6 136; and host-C 110C supports VM2 132 and VM5 135. In practice, virtualized computing environment 100 may include any number of hosts (also known as a "host computers", "host devices", "physical servers", "server systems", etc.), where each host may be supporting tens or hundreds of virtual machines.

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system. The term "hypervisor" may refer generally to a software layer or component that supports the execution of multiple virtualized computing instances, including system-level software in guest virtual machines that supports namespace containers such as Docker, etc.

Hypervisor 114A/114B/114C maintains a mapping between underlying hardware 112A/112B/112C and virtual resources allocated to respective virtual machines 131-136. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each virtual machine to support a guest operating system (OS) and applications. Corresponding to hardware 112A/112B/112C, the virtual resources may include virtual CPU, virtual memory, virtual disk, virtual network interface controller (VNIC), etc. Hardware resources may be emulated using virtual machine monitors (VMMs) 141-146, which may be considered as part of corresponding virtual machines 131-136, or alternatively, separated from virtual machines 131-136. In the example in FIG. 1, VNICs 151-156 are emulated by corresponding VMMs 141-146. Although one-to-one relationships are shown, one virtual machine may be associated with multiple VNICs (each VNIC having its own network address).

Through software defined networking (SDN), benefits similar to server virtualization may be derived for networking services. For example, logical overlay networks may be provided that are decoupled from the underlying physical network infrastructure, and therefore may be provisioned, changed, stored, deleted and restored programmatically without having to reconfigure the underlying physical hardware. Hypervisor 114A/114B/114C implements virtual switch 116A/116B/116C and logical distributed router (DR) instance 118A/118B/118C to handle egress packets from, and ingress packets to, corresponding virtual machines 131-136 located on logical overlay network(s). In practice, logical forwarding elements such as logical switches and logical distributed routers may be implemented in a distributed manner and can span multiple hosts to connect virtual machines 131-136. For example, logical switches that provide logical layer-2 connectivity may be implemented collectively by virtual switches 116A-C and represented internally using forwarding tables (not shown) at respective virtual switches 116A-C. Further, logical distributed routers that provide logical layer-3 connectivity may be implemented collectively by DR instances 118A-C and represented internally using routing tables (not shown) at respective DR instances 118A-C.

Packets are received from, or sent to, each virtual machine via an associated logical port. For example, logical ports 161-166 are associated with respective virtual machines 131-136. As used herein, the term "logical port" may refer generally to a port on a logical switch to which a virtualized computing instance is connected. A "logical switch" may refer generally to an SDN construct that is collectively implemented by virtual switches 116A-C in the example in FIG. 1, whereas "virtual switch" 116A/116B/116C may refer generally to a software switch or software implementation of a physical switch. In practice, there is usually a 1:1 mapping between a logical port on a logical switch and a virtual port on virtual switch 116A/116B/116C. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

SDN manager 180 and SDN controller 170 are example network management entities that facilitate implementation of software-defined (e.g., logical overlay) networks in virtualized computing environment 100. One example of an SDN controller is the NSX controller component of VMware NSX® (available from VMware, Inc.) that operates on a central control plane. SDN controller 170 may be a member of a controller cluster (not shown) that is configurable using SDN manager 180 operating on a management plane. Network management entity 170/180 may be implemented using physical machine(s), virtual machine(s), or both. Logical switches, logical routers, and logical overlay networks may be configured using SDN controller 170, SDN manager 180, etc.

SDN controller 170 is also responsible for collecting and disseminating control information relating to logical overlay networks and overlay transport tunnels, such as logical network topology, membership information of logical overlay networks, mobility of the members, protocol-to-hardware address mapping information of the members, VTEP information, firewall rules and policies, etc. To send and receive the control information, each host 110A/110B/110C may implement local control plane (LCP) agent 119A/119B/119C to interact with central control plane module 172 on SDN controller 170. For example, a control-plane channel may be established between SDN controller 170 and host 110A/110B/110C using Transmission Control Protocol (TCP) over Secure Sockets Layer (SSL), etc.

To facilitate communication among members of a logical overlay network, hypervisor 114A/114B/114C implements a virtual tunnel endpoint (VTEP) to encapsulate egress packets from a source with an outer (tunnel) header identifying the logical overlay network. The VTEP also performs decapsulation before virtual switch 116A/116B/116C forwards (decapsulated) packets to a destination. In the example in FIG. 1, VTEP-A may be implemented by hypervisor-A 114A, VTEP-B by hypervisor-B 114B, and VTEP-C by hypervisor-C 114C (the VTEPs are not shown for simplicity).

A logical overlay network may be formed using any suitable protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. In the example in FIG. 1, VM1 131 and VM2 132 may be members of a first VXLAN (e.g., VXLAN5001), while VM3 133 and VM4 134 are members of a second VXLAN (e.g., VXLAN5002), etc. The term "layer 2" may refer generally to a Media Access Control (MAC) layer; and "layer 3" to a network or Internet Protocol (IP) layer in the Open System Interconnection (OSI) model, although the concepts described may be used with other networking models. The term "packet" may refer generally to a group of bits that can be transported together from a source to a destination, such as message, segment, datagram, etc.

In practice, traffic flow monitoring may be configured in virtualized computing environment 100 to collect information about traffic flows associated with virtual machines 131-136. Traffic flow monitoring may be configured for various reasons, such as security analysis, security threat detection, performance monitoring and analysis, capacity planning, network optimization, etc. However, in order to configure traffic flow monitoring, some conventional approaches may necessitate users to have knowledge of the underlying physical implementation of virtualized computing environment 100, such as where virtual machines 131-136 and/or logical entities connecting them are physically located. This may be a non-trivial task, especially in virtualized computing environment 100 with a large number of hosts and virtual machines that are connected via various logical overlay networks, logical ports, logical switches, etc.

Traffic Flow Monitoring Configuration

Figure 2:
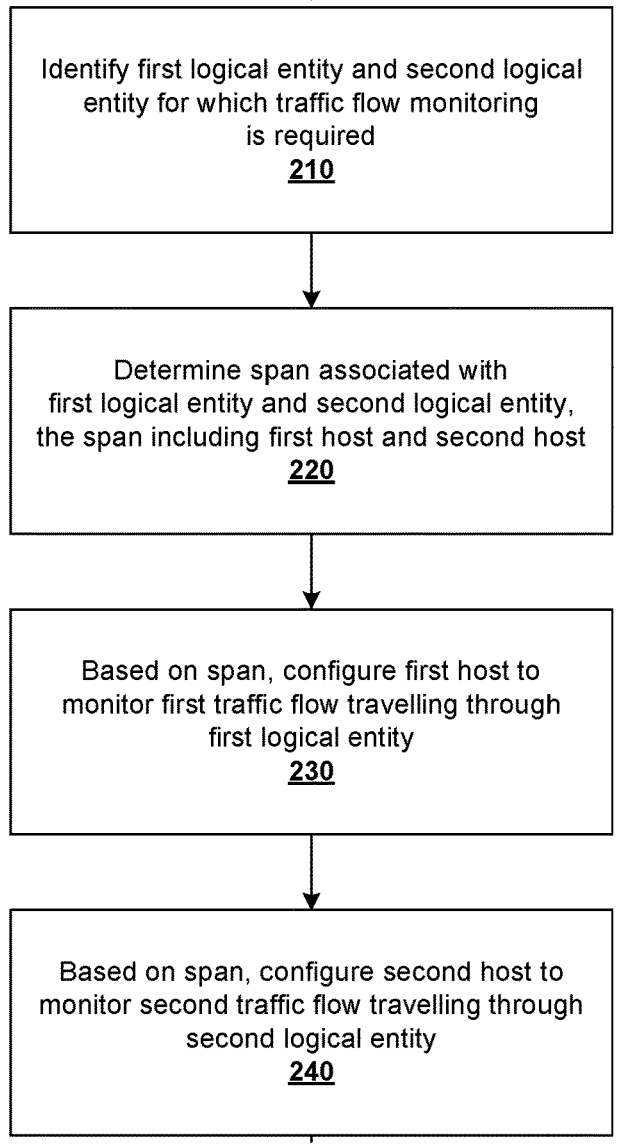
FIG. 2 is a flowchart of an example process for a network management entity to configure traffic flow monitoring in a virtualized computing environment.

According to examples of the present disclosure, traffic flow monitoring may be configured in virtualized computing environment 100 in an improved manner. Unlike conventional approaches, examples of the present disclosure may provide an abstraction from complex technical details associated with the underlying physical implementation of virtualized computing environment 100. In more detail, FIG. 2 is a flowchart of example process 200 for a network management entity to configure traffic flow monitoring in virtualized computing environment 100. Example process 200 may include one or more operations, functions, or actions illustrated by one or more blocks, such as 210 to 240. The various blocks may be combined into fewer blocks, divided into additional blocks, and/or eliminated depending on the desired implementation.

Throughout the present disclosure, various examples will be explained using host-A 110A as an example "first host"; host-C 110C as "second host"; VM1 131 as "first virtualized computing instance," VM2 132 as "second virtualized computing instance." In practice, example process 200 may be implemented by any suitable "network management entity," such as SDN controller 170 using central control plane module 172. Alternatively or additionally, example process 200 may be implemented by another network management entity such as SDN manager 180 depending on the desired implementation.

At 210 in FIG. 2, SDN controller 170 identifies a first logical entity and a second logical entity for which traffic flow monitoring is required. At 220, a span associated with the first logical entity and a second logical entity is determined to include first host-A 110A and second host-C 110C (see 190 in FIG. 1). At 230 and 240, host-A 110A is configured to monitor a first traffic flow travelling through the first logical entity (see 192 in FIG. 1) and host-C 110C is configured to monitor a second traffic flow travelling through the second logical entity (see 194 in FIG. 1).

As will be described further using FIG. 3 to FIG. 7, traffic flow monitoring may be configured for any suitable "logical entity" along a datapath, such as at a logical port level or a logical switch level. For example, at a logical port level, traffic flow monitoring may be configured for first logical entity=LP1 161 associated with VM1 131 and second logical entity=LP2 162 associated with VM2 132. In another example, at a logical switch level, traffic flow monitoring may be configured for a logical switch that is connected to first logical entity=LP1 161 and second logical entity=LP2 162. In both examples, the span determined at block 220 includes host-A 110A supporting LP1 161 and host-C 110C supporting LP2 162.

As used herein, the term "span" may refer generally to a group of one or more physical devices (e.g., hosts) supporting a logical entity. For example in FIG. 1, a particular logical port (e.g., LP1 161) is supported by one host (e.g., host-A 110A). On the other hand, a logical switch (to be discussed further using FIG. 3 and FIG. 5) may be implemented in a distributed manner and can span multiple hosts. Using a logical switch that is connected with LP1 161 and LP2 162 as an example, a first instance of the logical switch may be implemented by virtual switch 116A at host-A 110A and a second instance by virtual switch 116C at host-C 110C. A logical switch that spans multiple hosts may be implemented collectively by respective virtual switches and represented internally using forwarding tables.

The term "traffic flow" may refer generally to a set of packet(s) that share the same tuple values, such as source address, source port number, destination address, destination port number, protocol, etc. For example in FIG. 1, host-A 110A may be configured to monitor a traffic flow (see 196) travelling through LP1 161, or a logical switch to which LP1 161 is connected. Similarly, host-C 110C may be configured to monitor a traffic flow (see 196) travelling through LP2 162, or a logical switch to which LP2 162 is connected. Note that traffic flow 196 is an egress traffic flow ("first traffic flow") from the perspective of host-A 110A, but an ingress traffic flow ("second traffic flow") from that of host-C 110C. In practice, the "first traffic flow" and "second traffic flow" may be different traffic flows having different tuple values.

As will be described further using FIG. 3 to FIG. 6, configuration of particular host 110A/110C may involve generating and sending configuration information 192/194 to a local control plane component (e.g., LCP agent 119A/119C) of host 110A/110C. Configuration information 192/194 may be generated and sent to cause LCP agent 119A/119C to configure a data plane component (e.g., virtual switch 116A/116C) to perform traffic flow monitoring and to generate report information.

As will be described further using FIG. 7, the report information may specify a mapping between logical network information (e.g., logical overlay network identifier (ID), VTEP information, logical port information, etc.) and physical network information (e.g., physical NIC or port information, etc.) associated with monitored traffic flows. The Report information may be exported using any suitable protocol, such as NetFlow, Internet Protocol Flow Information Export (IPFIX), etc. For example, the IPFIX standard defines how traffic flow information is formatted and transferred from an exporter (e.g., host) to a collector (e.g., third-party system).

In a heterogeneous virtualized computing environment, hosts 110A-C may be configured with different hypervisor platforms or virtualization technologies, such as VMware ESX® or ESXi™ (available from VMware Inc.), Kernel-based Virtual Machine (KVM) from Red Hat Enterprise, XenServer® from Citrix Systems, Inc., Hyper-V™ from Microsoft Corp., etc. Each virtualization technology may specify its own implementation of the local control plane (e.g., LCP agent 119A/119B/119C) and/or data plane (e.g., virtual switch 116A/116B/116C). According to the examples of the present disclosure, traffic flow monitoring may be configured and implemented without burdening end users with the details of the underlying virtualization technologies at hosts 110A-C (also known as transport nodes). Various examples will be discussed below.

Detailed Process

Figure 3:
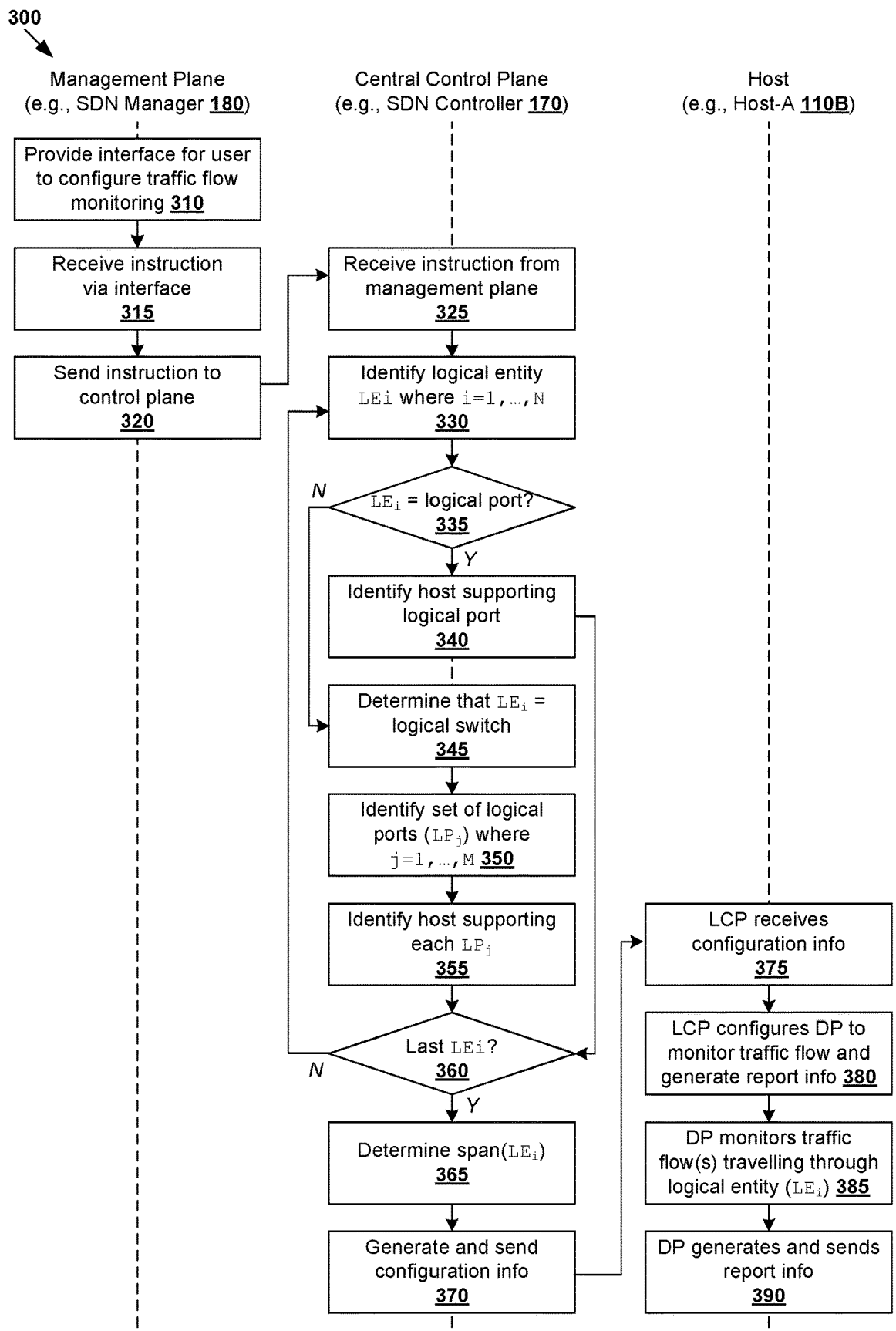
FIG. 3 is a flowchart of an example detailed process for configuring traffic flow monitoring in a virtualized computing environment.

FIG. 3 is a flowchart of example detailed process 300 for configuring traffic flow monitoring in virtualized computing environment 100. Example process 300 may include one or more operations, functions, or actions illustrated by one or more blocks, such as 310 to 390. The various blocks may be combined into fewer blocks, divided into additional blocks, and/or eliminated depending on the desired implementation. Depending on the desired implementation, various blocks in FIG. 3 may be performed by SDN manager 180 using management plane module 182, SDN controller 170 using central control plane module 172, and host 110A/110B/110C using hypervisor 114A/114B/114C or more particularly LCP agent 119A/119B/119C (local control plane) and virtual switch 116A/116B/116C (data plane).

At 310 and 315 in FIG. 3, SDN manager 180 receives an instruction to configure traffic flow monitoring via any suitable interface provided by SDN manager 180, such as a graphical user interface (GUI), command line interface (CLI), Representational State Transfer (REST) application programming interface (API), etc. A user (e.g., network administrator) operating a user device (not shown) may interact with the interface to specify a set of logical entities for which traffic flow monitoring is required and other configuration parameters. Alternatively or additionally, an automated system (e.g., automated monitoring system, orchestration engine, etc.) may configure traffic flow monitoring via the API.

FIG. 4A is a schematic diagram of example interface 400 for specifying logical entities for which traffic flow monitoring is required. In this example, a first user interface element labelled "Applied To" (see 410) provides a list of logical entities (see 420) for which traffic flow monitoring configuration may be configured, such as logical ports 161-166 and logical switches labelled "LS1," "LS2" and "LS3" (to be explained below using FIG. 5). The user may select a set of N≥1 logical entity or entities ($LE_i$, where i=1 ... N) from the list in FIG. 4A, such as according to the type of logical entity. The configuration may also be granular (i.e., applicable to selected logical entity or entities) or global (i.e., applicable to all logical entities available).

FIG. 4B is a schematic diagram of example interface 430 for specifying configuration parameters associated with traffic flow monitoring. In this example, a user interface element labelled "General" (see 440) allows the user to specify various configuration parameters, such as name (see 450), description (see 460), active timeout (see 470), idle timeout (see 480), maximum number of flows (see 490) and sampling probability (see 495). Depending on the desired implementation, active timeout period 470 specifies a time period (e.g., in seconds) after a traffic flow is expired even if more packets matching the traffic flow are received, idle timeout 480 specifies a time period after a traffic flow is expired if no more packets matching the traffic flow are received, maximum number of flows 490 specifies the maximum number of flow entries stored in a cache and sampling probability 495 specifies a probability (e.g., percentage in the range of 0-100%) that a packet is sampled.

In another example, SDN manager 180 may support various APIs to allow the user to configure, update or delete a traffic flow monitoring configuration. As demonstrated here, SDN manager 180 provides a relatively easy-to-use and easy-to-understand interface for traffic flow monitoring configuration. This way, the user may specify logical entity or entities for which traffic flow monitoring is required without have to worry about whether they are physically located. Also, intricate and complex details associated with the physical implementation of the relevant logical entities at host 110A/110B/110C may be abstracted from the user.

Span Calculation

At 320 and 325 in FIG. 3, SDN manager 180 on the management plane sends an instruction to SDN controller 170 on the central control plane to configure traffic flow monitoring. At 330 to 370 in FIG. 3, SDN controller 170 identifies a logical entity set ($LE_i$, i=1 N) for which traffic flow monitoring is required based on the instruction and determines a span of one or more hosts supporting the logical entity set. In the example in FIG. 3, the $i^{th}$ logical entity ($LE_i$) in the set may be a logical port to which a virtual machine is connected, or a logical switch that may be translated to multiple logical ports connected to the logical switch.

Figure 5:
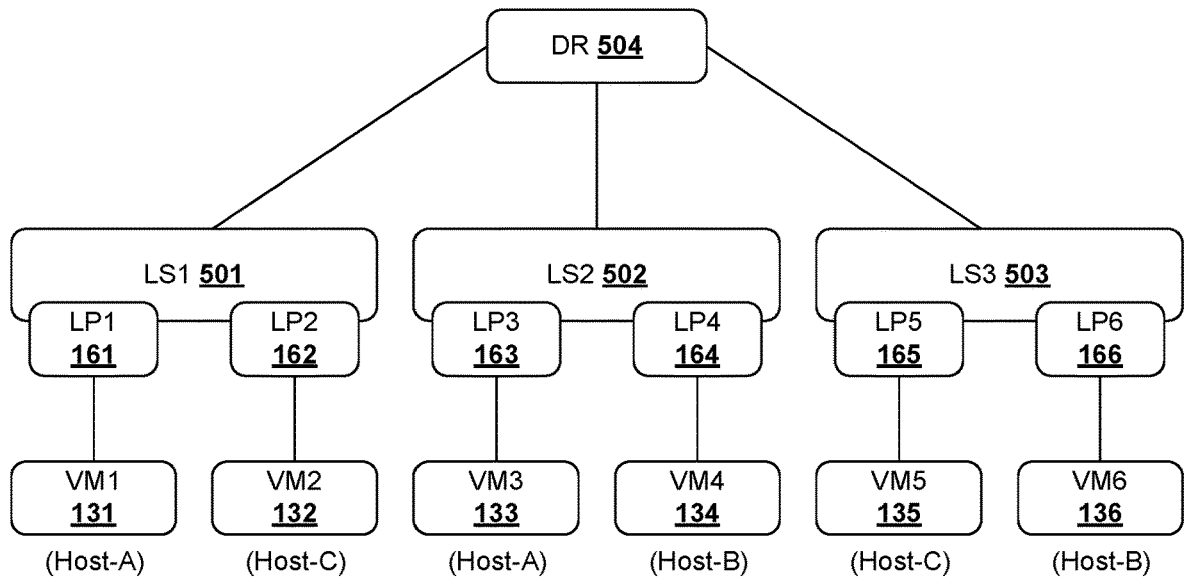
FIG. 5 is a schematic diagram illustrating an example logical network topology based on which span calculation may be performed in a virtualized computing environment.

In more detail, FIG. 5 is a schematic diagram illustrating example logical network topology 500 based on which span calculation may be performed in virtualized computing environment 100. In this example, virtual machines 131-136 in FIG. 1 are interconnected via logical switches 501-503 and logical router 504. Logical switches LS1 501, LS 502 and LS3 503 are configured to provide logical layer-2 switching services to virtual machines 131-136. Logical router DR 504 is a distributed router (DR) that is configured to provide logical layer-3 routing services to virtual machines 131-136. DR 504 is implemented in a distributed manner and span multiple hosts 110A-C supporting virtual machines 131-136.

In practice, another example of a logical router is a service router (SR) that provides centralized stateful services to the virtual machine(s), such as firewall protection, load balancing, etc. DR and SR are also known as distributed and centralized routing components, respectively. In a multi-tenant environment, a multi-tier topology may be used to provide isolation for multiple tenants. For example, a two-tier topology includes an upper tier (i.e., tier-0) associated with a provider logical router (PLR) and a lower tier (i.e., tier-1) associated with a tenant logical router (TLR). In this case, a logical router may be categorized as one of the following types: TLR-DR, PLR-DR, TLR-SR and PLR-SR (e.g., to connect to an external network).

According to 330, 335 and 340 in FIG. 3, in response to determination that a particular logical entity ($LE_i$) from the set is a logical port, SDN controller 170 identifies a particular host supporting the logical port. For example in FIG. 5, LP1 161 is connected to VM1 131, which is supported by host-A 110A. As such, referring to span information 510, span(LP1)=host-A 110A supporting VM1 131 (see 515). Similarly, span(LP2)=host-C 110C supporting VM2 132 (see 520), span(LP3)=host-A 110A supporting VM3 133 (see 525), span(LP4)=host-B 110B supporting VM4 134 (see 530), span(LP5)=host-C 110C supporting VM5 135 (see 535) and span(LP6)=host-B 110B supporting VM6 136 (see 540).

Logical switches 501-503 may span multiple hosts 110A-C. According to 345, 350 and 355 in FIG. 3, in response to determination that a particular logical entity ($LE_i$) is a logical switch, SDN controller 170 identifies a set of multiple logical ports ($LP_j$, where j=1 ... M) that are connected to the logical switch, and associated host(s). In practice, block 350 may be performed based on first mapping information that translates a logical switch (e.g., LS1 501) into the set multiple logical ports (e.g., LP1 161, LP2 162). Block 355 may be performed based on second mapping information that associates the multiple logical ports with respective hosts (e.g., host-A 110A, host-C 110C) or more particularly virtual switches (e.g., 116A, 116C).

For example in FIG. 5, logical switch LS1 501 is connected to LP1 161 and LP2 162. In this case, span(LS1) =span(LP1, LP2)=(host-A, host-C) based on span(LP1) =host-A 110A and span(LP2)=host-C 110C (see 545). Similarly, in relation to LS2 502, span(LS2)=span(LP3, LP4)=(host-A, host-B) based on span(LP3)=host-A 110A and span(LP4)=host-B 110B (see 550). In relation to LS3 503, span(LS3)=span(LP5, LP6)=(host-C, host-B) based on span(LP5)=host-C 110C and span(LP6)=host-B 110B (see 555). Blocks 330-360 may be repeated until each logical entity in the set is considered.

According to 365 and 370 in FIG. 3, once span calculation is completed performed for each logical entity in the set, SDN controller 170 determines a span associated with the set. At 375 in FIG. 3, SDN controller 170 generates and sends configuration information to a particular host identified in the span to cause the host to monitor a traffic flow travelling through a particular logical entity. The configuration information is also to cause the host to generate and send report information associated with the traffic flow to a collector (e.g., IPFIX collector). In practice, the configuration information specifies a set of logical entity or entities for which traffic flow monitoring is required and other associated configuration parameters 450-495 in FIG. 4A and FIG. 4B.

In a first example, a span associated with logical entity set=(LS1)=(LP1, LP2) includes host-A 110A and host-C 110C (see 545). In this case, SDN controller 170 generates and sends configuration information to cause host-A 110A to monitor traffic flows travelling through LP1 161 on host-A 110A. SDN controller 170 also generates and sends configuration information to cause host-C 110C to monitor traffic flows travelling through LP2 162 on host-C 110C. This way, traffic flows that originate from, or are destined for, VM1 131 and VM2 132 that are connected via LS1 501 and respective LP1 161 and LP2 162 may be monitored.

In a second example where logical entity set=(LP4, LS1), the total span includes span(LP4)=host-B 110B (see 530) and span(LS1)=span(LP1, LP2)=host-A 110A and host-C 110C (see 545). In this case, SDN controller 170 generates and sends configuration information to cause host-B 110B to monitor traffic flows travelling through LP4 164 on host-B 110B. This way, traffic flows that originate from, or are destined for, VM4 134 that is connected to LP4 164 may be monitored. Similar to the first example, SDN controller 170 also generates and sends configuration information to cause host-A 110A and host-C 110C to monitor traffic flows travelling through respective LP1 161 and LP2 162.

In practice, instead of the "granular" configuration that specifies a particular logical entity, a "global" traffic flow monitoring configuration may be made. In this case, SDN controller 170 identifies that all logical ports 161-166 and all logical switches 501-503 require traffic flow monitoring, and determines that the span includes all hosts 110A-C. Configuration information will be generated and sent to cause host-A 110A, host-B 110B and host-C 110C to monitor traffic flows travelling through logical ports 161-166 and logical switches 501-502. See also corresponding 560 in FIG. 5.

Traffic Flow Monitoring

At 375, 380, 385 and 390 in FIG. 3, based on the configuration information from SDN controller 170, host 110A/110B/110C monitors traffic flow(s) travelling through a particular logical entity, as well as generates and send report information associated with the traffic flow. In practice, blocks 375-380 may be implemented by a "local control plane component" of host 110A/110B/110C, such as LCP agent 119A/119B/119C that is capable of receiving control information from central control plane module 172 supported by SDN controller 170. LCP agent 119A/119B/119C may configure a "data plane component" of host 110A/110B/110C to perform blocks 385-390, such as virtual switch 116A/116B/116C supported by hypervisor 114A/114B/114C. Once traffic flow monitoring is configured, a particular host may send report information periodically (e.g., every 60 seconds, etc.).

Figure 6:
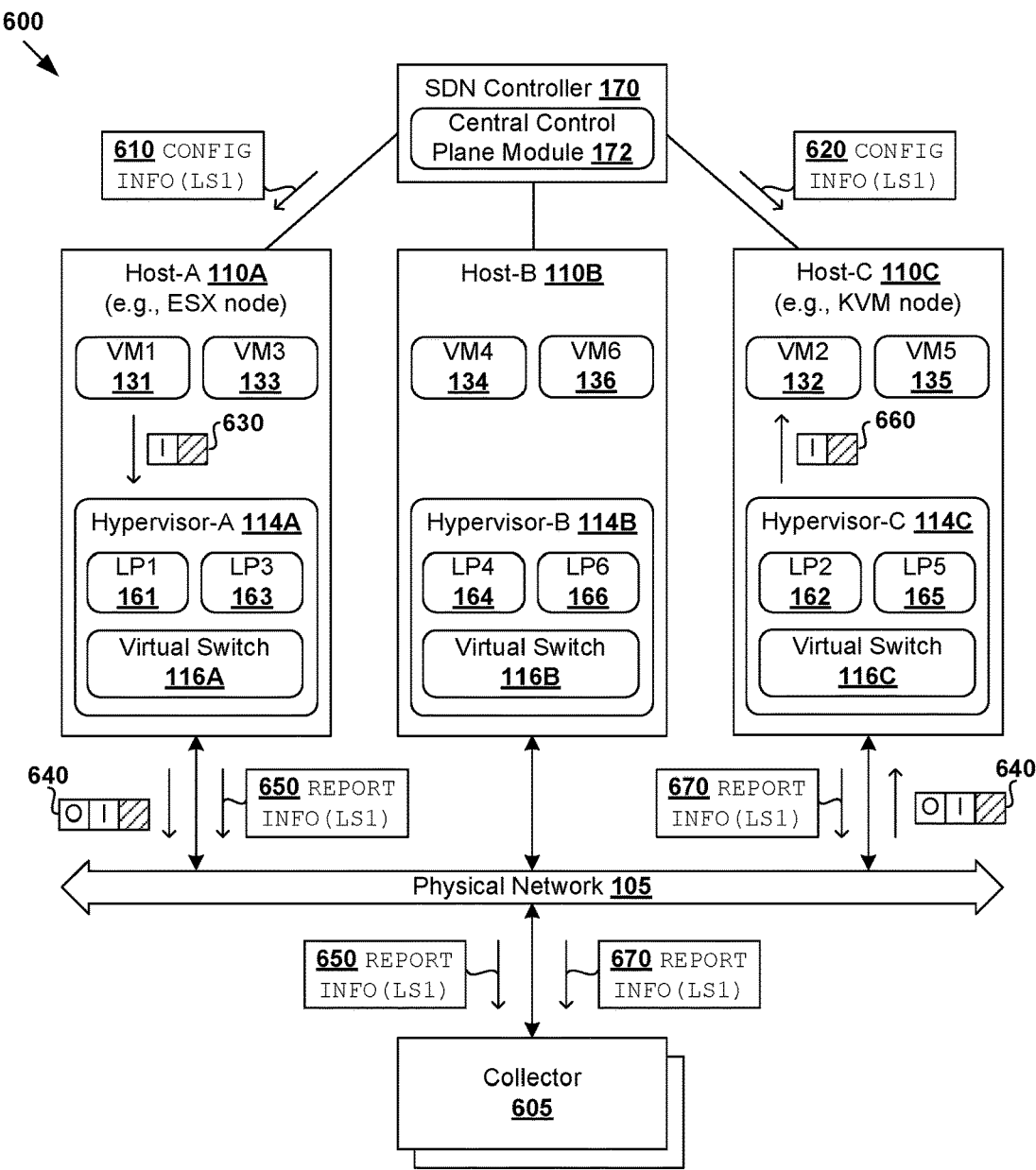
FIG. 6 is a schematic diagram illustrating an example of traffic flow monitoring in a virtualized computing environment.

FIG. 6 is a schematic diagram illustrating example 600 of traffic flow monitoring in virtualized computing environment 100. In practice, LCP agents 119A-C may implement different virtualization technologies. For example in FIG. 6, LCP agent 119A at host-A 110A may be supported by a different virtualization technology compared to LCP agent 119C at host-C 110C. At host-A 110A (labelled "ESX node"), LCP agent 119A supported by VMware ESX may be a kernel module for configuring the data plane to perform traffic flow monitoring on a specific logical port. At host-C 110C (labelled "KVM node"), LCP agent 119C supported by a KVM component or agent that manages switches, flows, logical ports and tunnel ports on host-C 110C. Any additional or alternative virtualization technology suitable for a heterogeneous virtualization computing environment may be implemented in practice.

To configure traffic flow monitoring for logical set=(LS1) associated with span=(host-A, host-C), SDN controller 170 generates and sends first configuration information 610 to host-A 110A and second configuration information 620 to host-C 110C according to the example in FIG. 3. In the following, consider the case where source VM1 131 on host-A 110A sends packets to destination VM2 132 on host-C 110C. Both VM1 131 and VM2 132 are located on VXLAN5001.

At host-A 110A, first configuration information 610 from SDN controller 170 causes LCP agent 119A to configure virtual switch 116A to monitor traffic flows travelling through LP1 161 connected to LS1 501. For example, in response to detecting egress packet 630 that includes inner header 632 and payload 634, it is determined that egress packet 630 originates from VM1 131 and is destined for VM2 132. The determination is based on source address information (IP address=IP-1, MAC address=MAC-1) associated with VM1 131 and destination address information (IP-2, MAC-2) associated with VM2 132. Since VM1 131 and VM2 132 are connected via LS1 501, it is determined that egress packet 630 should be forwarded via LS1 501.

Further, since VM1 131 and VM2 132 reside on different hosts, egress packet 630 is encapsulated with outer header 642 to generate encapsulated packet 640. Outer header 642 is addressed from (VTEP IP=IP-A, MAC=MAC-A) associated with a source VTEP-A implemented by host-A 110A to (VTEP IP=IP-C, MAC=MAC-C) associated with a destination VTEP-C implemented by host-C 110C. Outer header 642 also includes an identifier of a logical overlay network on which VM1 131 and VM2 132 are located (e.g., VNI=5001 for VXLAN5001). From a logical network perspective, encapsulated packet 640 is sent from VM1 131 to VM2 132 via LS1 501 connecting respective LP1 161 and LP2 162. From a physical network perspective, encapsulated packet 640 is sent from VM1 131 on host-A 110A to VM2 132 on host-C 110C via physical network 105.

Based on egress packet 630 and/or encapsulated egress packet 640, host-A 110A generates report information 650, such as in the form of IPFIX records, etc. Report information 650 may specify a mapping between logical network information and physical network information associated with a traffic flow that includes egress packet 630/640. Some examples will be discussed using FIG. 7, which is a schematic diagram illustrating example report information 650/700 associated with an example traffic flow in virtualized computing environment 100. In practice, it should be understood that report information 700 may be generated according to any suitable protocol (e.g., IPFIX) that specifies how the report information should be presented and transferred from an exporter (e.g., virtual switch) to a collector (see 605 in FIG. 6).

In the example in FIG. 7, in response to detecting egress packet 630, host-A 110A generates first report information 710 that includes one or more of the following: source IP address (e.g., IP-1), destination IP address (e.g., IP-2), packet size (e.g., in octets), flow start time, flow end time, source port number, destination port number, ingress interface, egress interface, protocol ID (e.g., TCP), flow end reason, TCP flags (e.g., reserved flags, acknowledgement (ACK) flag, synchronization (SYN) flag, etc.), direction (e.g., egress or ingress), IP type of service (ToS), maximum time to live (TTL), ingress interface attribute, egress interface attribute, role of exporter (e.g., host), etc. The ingress and egress interface attribute may identify the interface type, such as uplink port, access port, logical overlay network port, etc. Additionally, in response to detecting encapsulated egress packet 640, host-A 110A generates second report information 720, which includes first report information 710 and additional logical network information, such as logical overlay network ID (e.g., VNI=5001), tenant source address (e.g., IP-A associated with VTEP-A), tenant destination address (e.g., IP-C associated with VTEP-C), tenant source port, tenant destination port, tenant protocol, etc.

According to examples of the present disclosure, LCP agent 119A/119B/119C (local control plane) and/or virtual switch 116A/116B/116C (data plane) may rely on information about physical ports and logical ports in their persistence to generate the report information. In this case, report information 710/720 in FIG. 7 may also provide a mapping between logical port information and physical port information. This way, the user may be made aware of traffic flows at a logical network level, in addition to traffic flows at a physical network level. Once generated, host-A 110A may push report information 650/710/720 to any suitable number of collector(s) 605. Alternatively or additionally, each collector 605 may pull the report information 650/710/720 from host-A 110A, or access report information 650/710/720 from storage.

Further, at destination host-C 110C, second configuration information 620 from SDN controller 170 causes LCP agent 119C to configure virtual switch 116C to monitor traffic flows travelling through LP2 162 connected to LS1 501. In particular, in response to detecting encapsulated packet 640, decapsulation is performed to remove outer header 642 to generate decapsulated packet 660, which is then sent to VM2 132 based on (IP-2, MAC-2) in inner header 632. Similar to the example in FIG. 7, host-C 110C generates report information 670 based on encapsulated packet 640 and/or decapsulated packet 660, and sends report information 670 to collector 605.

Additionally, in the case of logical entity set=(LP4, LS1), SDN controller 170 generates and sends configuration information to cause LCP agent 119B to configure virtual switch 116B to perform traffic flow monitoring according to blocks 375-390 in FIG. 3. In this case, virtual switch 116B monitors traffic flows travelling through LP4 164 at host-B 110B, and generates report information associated with the traffic flows. The report information may include the examples discussed using FIG. 7. In practice, different report templates may be defined for different types of packets, such as IP packets, VXLAN IP packets (i.e., encapsulated packets), Internet Control Message Protocol (ICMP) packets, VXLAN ICMP packets, etc.

Figure 8:
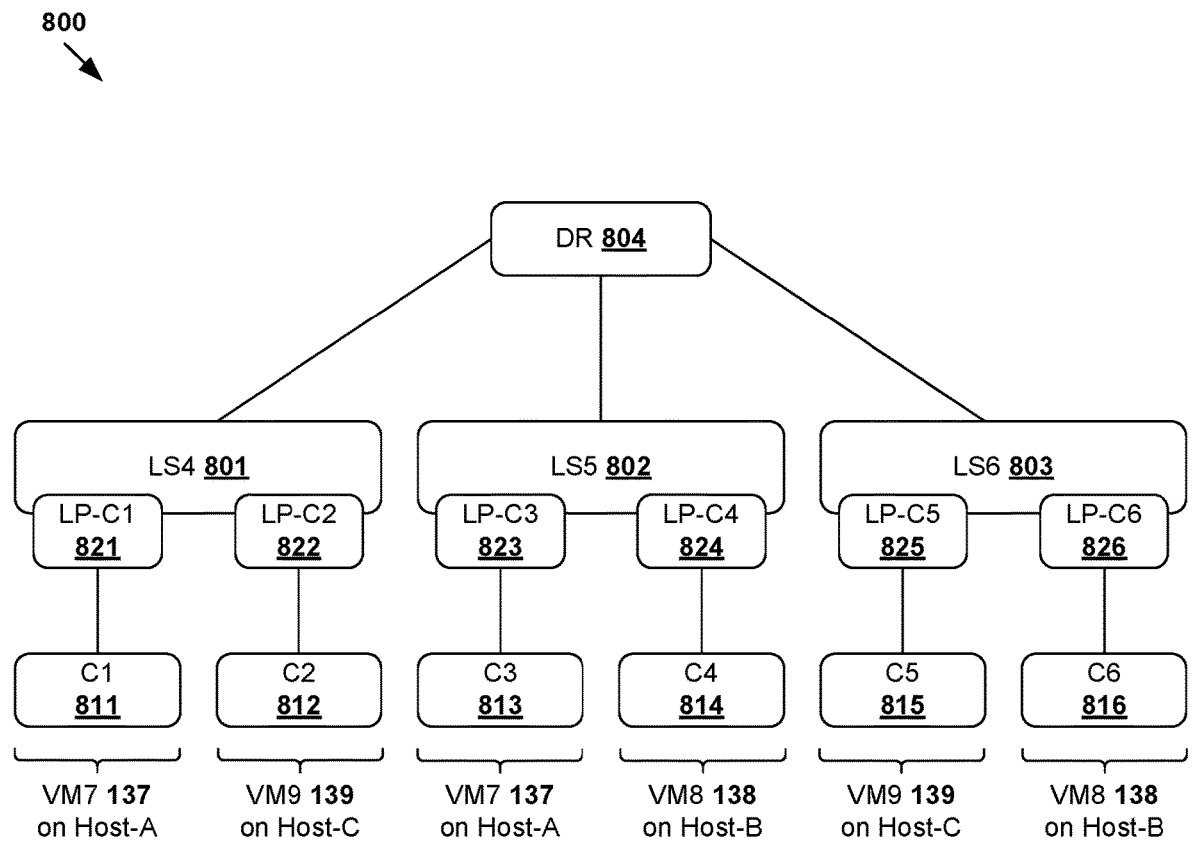
FIG. 8 is a schematic diagram illustrating an example logical network topology based on which span calculation may be performed for a group of containers in a virtualized computing environment.

Although described using virtual machines 131-136, examples of the present disclosures may be implemented to configure traffic flow monitoring for other data compute nodes, such as containers supported by virtual machines 131-136. Some examples will be described using FIG. 8, which is a schematic diagram illustrating example logical network topology 800 based on which span calculation may be performed for a group of containers in a virtualized computing environment. In the example in FIG. 8, containers C1 811 and C3 813 may be executed as isolated processes on a guest OS inside VM7 137 supported by host-A 110A. Similarly, C4 814 and C6 816 may be executed as isolated processes on a guest OS inside VM8 138 supported by host-B 110B, and C2 812 and C5 815 on a guest OS inside VM9 139 supported by host-C 110C.

As used herein, the term "container" (also known as "container instance") is used generally to describe an application that is encapsulated with all its dependencies (e.g., binaries, libraries, etc.). Containers 811-816 are "OS-less", meaning that they do not include any OS that could weigh 10 s of Gigabytes (GB). This makes containers 811-816 more lightweight, portable, efficient and suitable for delivery into an isolated OS environment. Running containers inside a virtual machine (known as "containers-on-virtual-machine" approach) not only leverages the benefits of container technologies but also that of virtualization technologies. Containers 811-816 are associated with respective logical ports labelled LP-C1 821, LP-C2 822, LP-C3 823, LP-C4 824, LP-05 825 and LP-C6 826 that are connected to logical switches 801-803, which are in turn connected to logical router DR 804. In practice, logical switches 801-803 are collectively implemented using virtual switches 116A-C and represented internally using forwarding tables (not shown) at respective virtual switches 116A-C.

Similar to the examples in FIG. 3 to FIG. 5, span calculation may be performed for logical entity or entities for which traffic flow monitoring is required. For example, in relation to LS4 801, span(LS4)=span(LP-C1, LP-C2)=(host-A, host-C) based on span(LP-C1)=host-A 110A and span(LP-C2)=host-C 110C (see 830, 835, 860 in FIG. 8). Similarly, in relation to LS5 802, span(LS5)=span(LP-C3, LP-C4)=(host-A, host-B) based on span(LP-C3)=host-A 110A and span(LP-C4)=host-B 110B (see 840, 845, 865 in FIG. 8). In relation to LS6 803, span(LS6)=span(LP-05, LP-C6)=(host-C, host-B) based on span(LP-05)=host-C 110C and span(LP-C6)=host-B 110B (see 850, 855, 870 in FIG. 8). In a global configuration, span(LS4, LS5, LS6)=(host-A, host-B, host-C); see 875 in FIG. 8.

Similar to the examples in FIG. 6 and FIG. 7, traffic flow monitoring may be configured for a logical entity set associated with container(s), such as (LS4)=(LP-C1, LP-C2) with span=(host-A, host-C). In this case, SDN controller 170 generates and sends configuration information to cause host-A 110A to monitor traffic flows travelling through LP-C1 821 associated with C1 811 on host-A 110A. SDN controller 170 also generates and sends configuration information to cause host-C 110C to monitor traffic flows travelling through LP-C2 822 associated with C2 812 on host-C 110C. This way, traffic flows that originate from, or are destined for, C1 811 and C2 812 that are connected via LS4 801 and respective LP-C1 821 and LP-C2 822 may be monitored.

Although explained using logical ports and logical switches, it should be understood that examples of the present disclosure may be implemented for other types of logical entities, such as logical routers, etc. For example, to monitor traffic flow monitoring at DR 504 in FIG. 5, span(DR)=span(LS1, LS2, LS3)=(host-A, host-B, host-C). Similarly, to monitor traffic flow monitoring at DR 804 in FIG. 8, span(DR)=span(LS4, LS5, LS6)=(host-A, host-B, host-C).

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8. For example, a computer system may be deployed in virtualized computing environment 100 to perform the functionality of a network management entity (e.g., SDN manager 180 or SDN controller 170), host 110A/110B/110C, etc.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a network management entity to configure traffic flow monitoring in a virtualized computing environment that includes the network management entity, a first host, and a second host, the method comprising:
   identifying a first logical entity and a second logical entity for which traffic flow monitoring is required;
   determining a span associated with the first logical entity and the second logical entity, wherein the span includes the first host supporting the first logical entity and the second host supporting the second logical entity; and
   based on the span, configuring the first host to monitor a first traffic flow travelling through the first logical entity at the first host, and the second host to monitor a second traffic flow travelling through the second logical entity at the second host, wherein at least one of:
   configuring the first host includes configuring the first host to generate first report information that specifies a mapping between logical network information and physical network information associated with the first traffic flow so as to enable the network management entity to determine traffic flows at a logical network level and at a physical network level; or
   configuring the second host includes configuring the second host to generate second report information that specifies a mapping between logical network information and physical network information associated with the second traffic flow so as to enable the network management entity to determine the traffic flows at the logical network level and at the physical network level.

2. The method of claim 1, wherein identifying the first logical entity and the second logical entity comprises:
   identifying a first logical port, being the first logical entity, that is associated with a first virtualized computing instance supported by the first host; and
   identifying a second logical port, being the second logical entity, that is associated with a second virtualized computing instance supported by the second host.

3. The method of claim 2, wherein identifying the first logical entity and the second logical entity comprises:
   prior to identifying the first logical port and the second logical port, identifying a logical switch for which traffic flow monitoring is required, wherein the logical switch is connected to the first logical port and the second logical port.

4. The method of claim 3, wherein configuring the first host and the second host comprises:
   configuring the first host to monitor the first traffic flow travelling through the logical switch or the first logical port at the first host; and
   configuring the second host to monitor the second traffic flow travelling through the logical switch or the second logical port at the second host.

5. The method of claim 1, wherein configuring the first host and the second host comprises:
   generating and sending first configuration information to a first local control plane (LCP) component of the first host; and
   generating and sending second configuration information to a second LCP component of the second host, wherein the second LCP component is supported by a different virtualization technology compared to the first LCP component.

6. The method of claim 1, wherein configuring the first host and the second host comprises one or more of:
   generating and sending the first configuration information to cause a first local control plane (LCP) component of the first host to configure a first data plane component to monitor the first traffic flow; and
   generating and sending the second configuration information to cause a second LCP component of the second host to configure a second data plane component to monitor the second traffic flow.

7. The method of claim 6, wherein configuring the first host and the second host comprises one or more of:
   generating and sending the first configuration information to cause the first LCP component to configure the first data plane component to generate the first report information that specifies the mapping between the logical network information and the physical network information associated with the first traffic flow; and
generating and sending the second configuration information to cause the second LCP component to configure the second data plane component to generate the second report information that specifies the mapping between the logical network information and the physical network information associated with the second traffic flow.

8. A non-transitory computer-readable storage medium that includes a set of instructions which, in response to execution by a processor of a computer system, cause the processor to perform a method to configure flow monitoring in a virtualized computing environment that includes a first host and a second host, wherein the method comprises:
identifying a first logical entity and a second logical entity for which traffic flow monitoring is required;
determining a span associated with the first logical entity and the second logical entity, wherein the span includes the first host supporting the first logical entity and the second host supporting the second logical entity; and
based on the span, configuring the first host to monitor a first traffic flow travelling through the first logical entity at the first host, and the second host to monitor a second traffic flow travelling through the second logical entity at the second host, wherein at least one of:
configuring the first host includes configuring the first host to generate first report information that specifies a mapping between logical network information and physical network information associated with the first traffic flow so as to enable the network management entity to determine traffic flows at a logical network level and at a physical network level; or
configuring the second host includes configuring the second host to generate second report information that specifies a mapping between logical network information and physical network information associated with the second traffic flow so as to enable the network management entity to determine the traffic flows at the logical network level and at the physical network level.

9. The non-transitory computer-readable storage medium of claim 8, wherein identifying the first logical entity and the second logical entity comprises:
identifying a first logical port, being the first logical entity, that is associated with a first virtualized computing instance supported by the first host; and
identifying a second logical port, being the second logical entity, that is associated with a second virtualized computing instance supported by the second host.

10. The non-transitory computer-readable storage medium of claim 9, wherein identifying the first logical entity and the second logical entity comprises:
prior to identifying the first logical port and the second logical port, identifying a logical switch for which traffic flow monitoring is required, wherein the logical switch is connected to the first logical port and the second logical port.

11. The non-transitory computer-readable storage medium of claim 10, wherein configuring the first host and the second host comprises:
configuring the first host to monitor the first traffic flow travelling through the logical switch or the first logical port at the first host; and
configuring the second host to monitor the second traffic flow travelling through the logical switch or the second logical port at the second host.

12. The non-transitory computer-readable storage medium of claim 8, wherein configuring the first host and the second host comprises:
generating and sending first configuration information to a first local control plane (LCP) component of the first host; and
generating and sending second configuration information to a second LCP component of the second host, wherein the second LCP component is supported by a different virtualization technology compared to the first LCP component.

13. The non-transitory computer-readable storage medium of claim 8, wherein configuring the first host and the second host comprises one or more of:
generating and sending the first configuration information to cause a first local control plane (LCP) component of the first host to configure a first data plane component to monitor the first traffic flow; and
generating and sending the second configuration information to cause a second LCP component of the second host to configure a second data plane component to monitor the second traffic flow.

14. The non-transitory computer-readable storage medium of claim 13, wherein configuring the first host and the second host comprises one or more of:
generating and sending the first configuration information to cause the first LCP component to configure the first data plane component to generate the first report information that specifies the mapping between the logical network information and the physical network information associated with the first traffic flow; and
generating and sending the second configuration information to cause the second LCP component to configure the second data plane component to generate the second report information that specifies the mapping between the logical network information and the physical network information associated with the second traffic flow.

15. A computer system to configure traffic flow monitoring in a virtualized computing environment that includes a first host and a second host, the computer system comprising:
a processor; and
a non-transitory computer-readable medium having stored thereon instructions that, in response to execution by the processor, cause the processor to:
identify a first logical entity and a second logical entity for which traffic flow monitoring is required;
determine a span associated with the first logical entity and the second logical entity, wherein the span includes the first host supporting the first logical entity and the second host supporting the second logical entity; and
based on the span, configure the first host to monitor a first traffic flow travelling through the first logical entity at the first host, and the second host to monitor a second traffic flow travelling through the second logical entity at the second host, wherein at least one of:
configuration of the first host includes configuration of the first host to generate first report information that specifies a mapping between logical network information and physical network information associated with the first traffic flow so as to enable the network management entity to determine traffic flows at a logical network level and at a physical network level; or configuration of the second host includes configuration of the second host to generate second report information that specifies a mapping between logical network information and physical network information associated with the second traffic flow so as to enable the network management entity to determine the traffic flows at the logical network level and at the physical network level.

16. The computer system of claim 15, wherein the instructions that cause the processor to identify the first logical entity and the second logical entity cause the processor to:
identify a first logical port, being the first logical entity, that is associated with a first virtualized computing instance supported by the first host; and
identify a second logical port, being the second logical entity, that is associated with a second virtualized computing instance supported by the second host.

17. The computer system of claim 16, wherein the instructions that cause the processor to identify the first logical entity and the second logical entity cause the processor to:
prior to identifying the first logical port and the second logical port, identify a logical switch for which traffic flow monitoring is required, wherein the logical switch is connected to the first logical port and the second logical port.

18. The computer system of claim 17, wherein the instructions that cause the processor to configure the first host and the second host cause the processor to:
configure the first host to monitor the first traffic flow travelling through the logical switch or the first logical port at the first host; and
configure the second host to monitor the second traffic flow travelling through the logical switch or the second logical port at the second host.

19. The computer system of claim 15, wherein the instructions that cause the processor to configure the first host and the second host cause the processor to:

generate and send first configuration information to a first local control plane (LCP) component of the first host; and
generate and send second configuration information to a second LCP component of the second host, wherein the second LCP component is supported by a different virtualization technology compared to the first LCP component.

20. The computer system of claim 15, wherein the instructions that cause the processor to configure the first host and the second host cause the processor to one or more of:
generate and send the first configuration information to cause a first local control plane (LCP) component of the first host to configure a first data plane component to monitor the first traffic flow; and
generate and send the second configuration information to cause a second LCP component of the second host to configure a second data plane component to monitor the second traffic flow.

21. The computer system of claim 20, wherein the instructions that cause the processor to configure the first host and the second host cause the processor to one or more of:
generate and send the first configuration information to cause the first LCP component to configure the first data plane component to generate the first report information that specifies the mapping between the logical network information and the physical network information associated with the first traffic flow; and
generate and send the second configuration information to cause the second LCP component to configure the second data plane component to generate the second report information that specifies the mapping between the logical network information and the physical network information associated with the second traffic flow.

* * * * *